US012670607B2

(12) United States Patent　　(10) Patent No.:　US 12,670,607 B2
Koh et al.　　(45) Date of Patent:　Jun. 30, 2026

(54) DETECTION CIRCUIT AND ASSOCIATED DETECTION METHOD

(71) Applicant: Realtek Semiconductor Corp., HsinChu (TW)

(72) Inventors: Chih-Yuan Koh, HsinChu (TW); Shih-Tse Chen, HsinChu (TW)

(73) Assignee: Realtek Semiconductor Corp., HsinChu (TW)

( * ) Notice: Subject to any disclaimer, the term of this patent is extended or adjusted under 35 U.S.C. 154(b) by 301 days.

(21) Appl. No.: 18/232,364

(22) Filed: Aug. 10, 2023

(65) Prior Publication Data

US 2024/0257370 A1　　Aug. 1, 2024

(30) Foreign Application Priority Data

Jan. 30, 2023　(TW) ................................ 112102920

(51) Int. Cl.
　*G06K 9/00*　　(2022.01)
　*G06T 7/50*　　(2017.01)
　*G06T 7/70*　　(2017.01)
(52) U.S. Cl.
　CPC ................. *G06T 7/50* (2017.01); *G06T 7/70* (2017.01); *G06T 2207/20081* (2013.01); *G06T 2207/20084* (2013.01); *G06T 2207/30196* (2013.01)
(58) Field of Classification Search
　CPC . G06T 2207/20081; G06T 2207/20084; G06T 2207/30196; G06T 7/50; G06T 7/70
　See application file for complete search history.

(56) References Cited

U.S. PATENT DOCUMENTS

| | | | | |
|---|---|---|---|---|
| 2017/0316578 A1* | 11/2017 | Fua | .......................... | G06T 7/246 |
| 2017/0344808 A1* | 11/2017 | El-Khamy | ................ | G06T 7/70 |
| 2021/0026355 A1* | 1/2021 | Chen | ....................... | G01S 17/89 |

OTHER PUBLICATIONS

Franke, Marten, et al. "Bounding box dataset augmentation for long-range object distance estimation." Proceedings of the IEEE/CVF international conference on computer vision. 2021. (Year: 2021).*

Vajgl, Marek, Petr Hurtik, and TomáNejezchleba. "Dist-yolo: Fast object detection with distance estimation." Applied sciences 12.3 (2022): 1354. (Year: 2022).*

Zhu, Jing, and Yi Fang. "Learning object-specific distance from a monocular image." Proceedings of the IEEE/CVF International Conference on computer vision. 2019. (Year: 2019).*

(Continued)

*Primary Examiner* — Hadi Akhavannik

(74) *Attorney, Agent, or Firm* — Winston Hsu

(57)　　ABSTRACT

The present invention provides a detection circuit including a neural network module and a calculation circuit is disclosed. The neural network module is configured to receive an image to generate an output tensor, wherein the output tensor includes position information of a specific object and distance adjustment information. The calculation circuit is coupled to the neural network module, and is configured to calculate an initial distance between an image capture device and the specific object according to the position information of the specific object, and generate an estimated distance according to the initial distance and the distance adjustment information.

8 Claims, 4 Drawing Sheets

(56)  References Cited

OTHER PUBLICATIONS

Bertoni, Lorenzo, Sven Kreiss, and Alexandre Alahi. "Monoloco: Monocular 3d pedestrian localization and uncertainty estimation." Proceedings of the IEEE/CVF international conference on computer vision. 2019. (Year: 2019).*

Davydov, Yury, Wen-Hui Chen, and Yu-Chen Lin. "Supervised object-specific distance estimation from monocular images for autonomous driving." Sensors 22.22 (2022): 8846. (Year: 2022).*

Seungyoo Lee et al., "Vehicle Distance Estimation from a Monocular Camera for Advanced Driver Assistance Systems", symmetry, MDPI, Basel, Switzerland, Dec. 15, 2022, https://doi.org/10.3390/sym14122657, pp. 1-14., Dec. 15, 2022.

* cited by examiner

Figure 2:
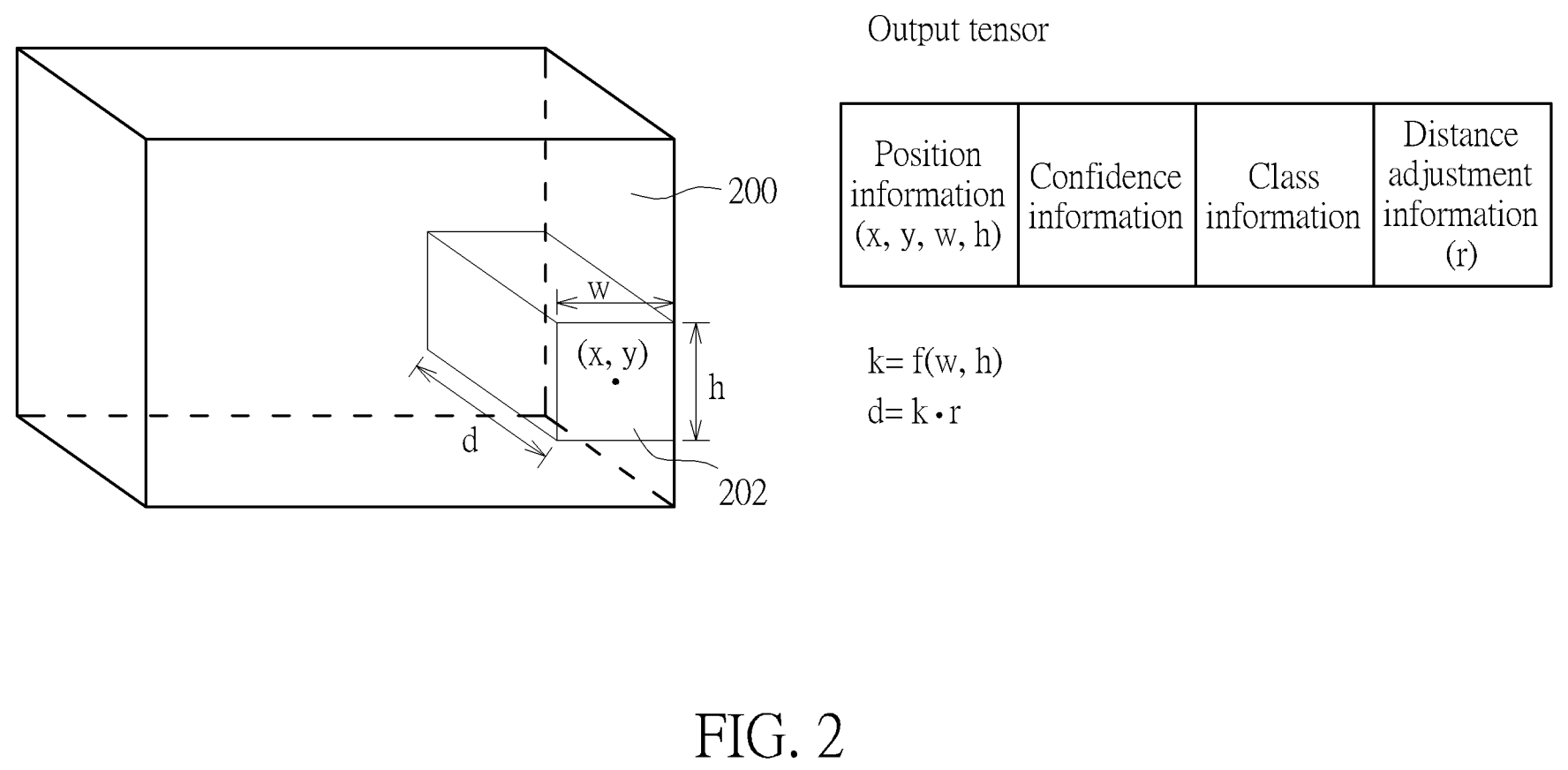

Output tensor

| Position information (x, y, w, h) | Confidence information | Class information | Distance adjustment information (r) |
|---|---|---|---|

$k = f(w, h)$ $d = k \cdot r$

Position information : x1, y1, w1, h1
Distance information : d1

$k1 = f(w1, h1)$ $r1 = \dfrac{d1}{k1}$

Position information : x2, y2, w2, h2
Distance information : d2

$k2 = f(w2, h2)$ $r2 = \dfrac{d2}{k2}$

Position information : x3, y3, w3, h3
Distance information : d3

$k3 = f(w3, h3)$ $r3 = \dfrac{d3}{k3}$

DETECTION CIRCUIT AND ASSOCIATED DETECTION METHOD

BACKGROUND OF THE INVENTION

1. Field of the Invention

The present invention relates to a detection circuit comprising a neural network module.

2. Description of the Prior Art

The current distance detection device mainly calculates a distance between an object and the device by detecting a time difference between a transmission signal and a reflected signal. However, due to the high production cost of high-precision distance detection device, it is difficult to popularize and apply the distance detection device in portable electronic devices.

Recently, with the popularity of artificial intelligence, the technology of using a single camera with deep learning to predict the distance between an object and the camera has begun to develop. One of the techniques is to combine object detection and monocular depth estimation models to obtain a depth map to obtain the distance between the object and the camera. However, the depth map obtained by the above models is easily affected by factors such as obstruction, light, color, etc., so the calculated distance between the object and the camera will have a large error. In addition, another kind of technology is multi-stage model prediction, that is, using multiple different models in sequence to process the image captured by the camera to obtain the distance between the object and the camera. However, multi-stage model prediction requires a lot of memory space and takes a long time for calculation, so it is not suitable for electronic devices with limited performance.

SUMMARY OF THE INVENTION

It is therefore an objective of the present invention to provide a distance detection circuit and associated electronic device, which can process images captured by a single camera by using a single model to obtain the distance between an object in the image and the camera, to solve the problem described in the prior art.

According to one embodiment of the present invention, a detection circuit comprising a neural network module and a calculation circuit is disclosed. The neural network module is configured to receive an image to generate an output tensor, wherein the output tensor comprises position information of a specific object and distance adjustment information. The calculation circuit is coupled to the neural network module, and is configured to calculate an initial distance between an image capture device and the specific object according to the position information of the specific object, and generate an estimated distance according to the initial distance and the distance adjustment information.

According to one embodiment of the present invention, a detection method comprises the steps of: using a neural network module to receive an image to generate an output tensor, wherein the output tensor comprises position information of a specific object and distance adjustment information; and calculating an initial distance between an image capture device and the specific object according to the position information of the specific object; and generating an estimated distance according to the initial distance and the distance adjustment information.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a diagram of an output tensor generated by using a neural network module to process an image.

DETAILED DESCRIPTION

Figure 1:
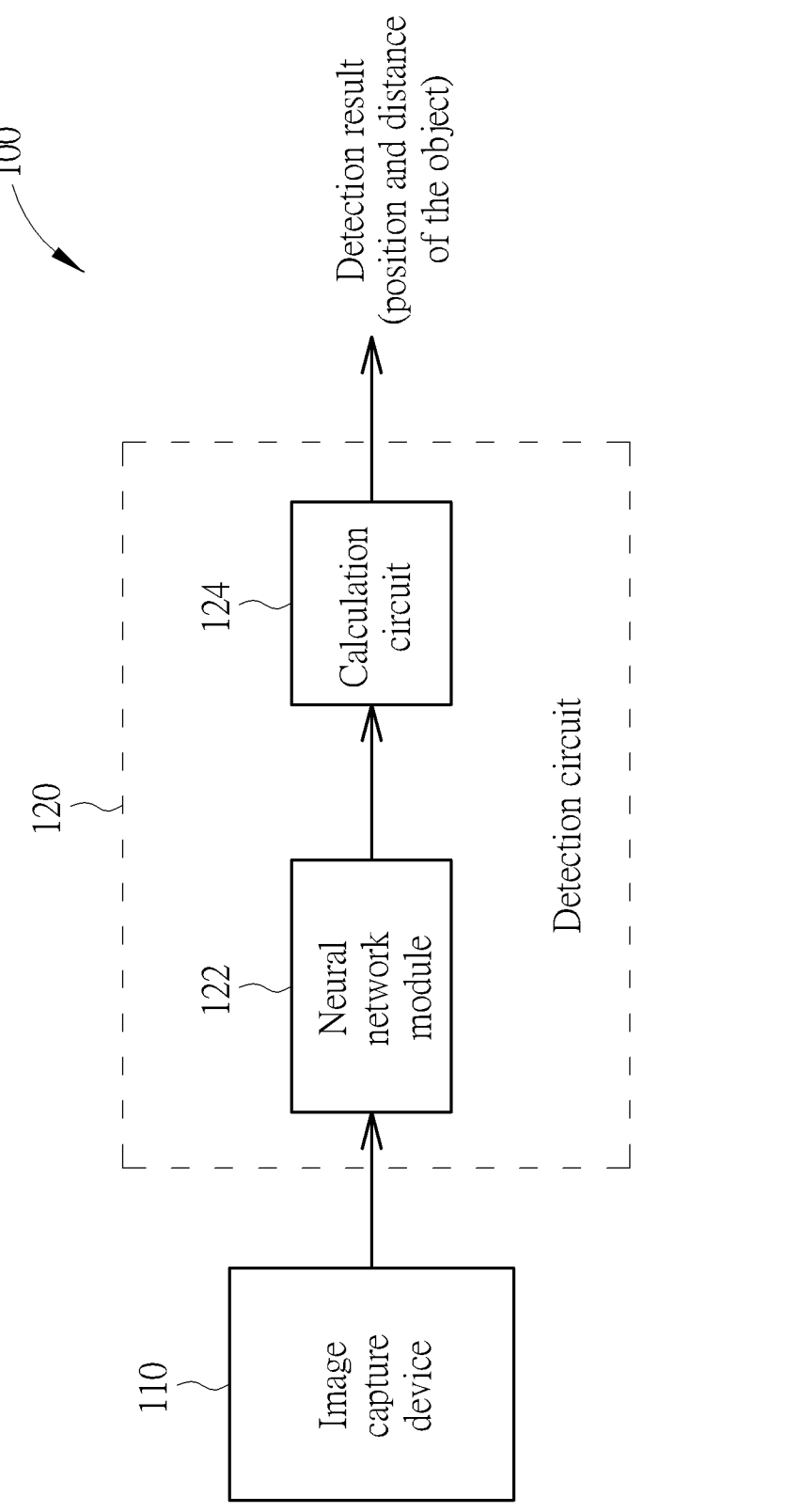
FIG. 1 is a diagram illustrating an electronic device according to one embodiment of the present invention.

FIG. 1 is a diagram illustrating an electronic device 100 according to one embodiment of the present invention. As shown in FIG. 1, the electronic device 100 comprises an image capture device 110 and a detection circuit 120, wherein the detection circuit 120 comprises a neural network module 122 and a calculation circuit 124. In this embodiment, the image capture device 110 may be a camera, and the detection circuit 120 is used to determine whether the image captured by the image capture device 110 contains a specific object (for example, a person), and to determine a distance between the specific object and the image capture device 110, so as to generate a detection result. The electronic device 100 may be a smart phone, a tablet, a monitor, or any other electronic device including or coupled to the image capture device 110. In other embodiments of the present invention, the image capture device 110 can be located outside the electronic device 100, that is, the electronic device 100 can receive the image captured by the image capture device 110 in a wired or wireless manner, for the detection circuit 120 to perform analysis and determination.

In this embodiment, the neural network module 122 can be a convolutional neural network (CNN) module, such as the known YOLO object detection model, which includes multiple convolutional layers and at least one fully connected layer, which are used to process an image to generate an output tensor, wherein the output tensor may be a matrix including a plurality of elements. FIG. 2 is a diagram of an output tensor generated by using the neural network module 122 to process an image. As shown in FIG. 2, the image 200 comprises a specific object, and the output tensor generated by using the neural network module 122 to process the image 200 comprises the following four information: position information, which includes a center position (x, y), a width 'w' and a height 'h' of a region 202 including the specific object, wherein the width 'w' and the height 'h' can be represented by a number of pixels; confidence information, which is used to indicate the reliability of the specific object contained in the region 202; class information, used to indicate which class/category the content contained in the region 202 belongs to; and distance adjustment information 'r', which is used to adjust an initial distance to generate an estimated distance between the specific object and the image capture device 110.

It is noted that since the position information, confidence information and class information shown in FIG. 2 are well known to a person skilled in the art, and the main feature of the present invention is the distance adjustment information 'r', the following description focuses on generating the initial distance and calculating the estimated distance according to the distance adjustment information 'r'.

In this embodiment, first, the calculation circuit 124 calculates the initial distance between the image capture device 110 and the specific object according to the width 'w' and height 'h' of the region 202 in the position information. Specifically, the calculation circuit 124 can use the following formula (1) to calculate the initial distance between the image capture device 110 and the specific object:

$$k = \sqrt{\alpha x * \alpha y * \frac{w_{real} * h_{real}}{w_{img} * h_{img}}}. \tag{1}$$

In the above formula, 'k' is the initial distance between the image capture device 110 and the specific object, '$\alpha x$' is a focal length of the image capture device 110 in the horizontal direction, '$\alpha y$' is a focal length of the image capture device 110 in the vertical direction, '$w_{real}$' is a default width of the specific object, '$h_{real}$' is the default height of the specific object, '$w_{img}$' is the width of the region 202 (i.e., the width 'w' in the position information of the output tensor), and '$h_{img}$' is the height of the region 202 (i.e., the height 'h' in the position information of the output tensor). In this embodiment, '$\alpha x$' and '$\alpha y$' are known parameters of the image capture device 110, and if the specific object is a person, then '$w_{real}$' can be a default width of a normal person, such as 0.6 meters, and '$h_{real}$' can be a default height of the normal person, such as 1.7 meters.

It is noted that the above formula (1) is only used as an example rather than a limitation of the present invention. As long as the calculation circuit 124 can calculate the initial distance between the image capture device 110 and the specific object according to the height and width of the region 202, the formula (1) can be changed appropriately.

Since '$w_{real}$' and $h_{real}$' used in equation (1) are the default width and default height of the normal person and are fixed values, the initial distance 'k' calculated by the formula (1) will vary depending on the different posture and action of the person. Therefore, the calculation circuit 124 additionally adjusts the above-mentioned initial distance 'k' according to the distance adjustment information 'r' in the output tensor to obtain the estimated distance between the image capture device 110 and the specific object, such as 'd' shown in FIG. 2. In this embodiment, the calculation circuit 124 multiplies the initial distance 'k' by the distance adjustment information 'r' to generate the estimated distance 'd', that is, the calculation circuit 124 can use the following formula (2) to calculate the estimated distance:

$$d = k * r. \tag{2}$$

It is noted that the above formula (2) is only used as an example rather than a limitation of the present invention.

As mentioned above, since the detection circuit 120 can calculate the estimated distance between the image capture device 110 and the specific object through the output tensor generated by the one-stage neural network module, and the calculated estimated distance has high accuracy, so the distance detection of the specific object can be accurately performed while saving the performance of the electronic device 100.

In order to make the distance adjustment information 'r' in the output tensor to accurately and effectively adjust the initial distance 'k' to obtain the estimated distance 'd', the training targets used by the neural network module 122 in the training phase includes the distance adjustment information calculated according to a real position of the person and a real distance between the person and the image capture device 110, so that the distance adjustment information 'r' in the output tensor reflects the posture or action of the person.

Figure 3:
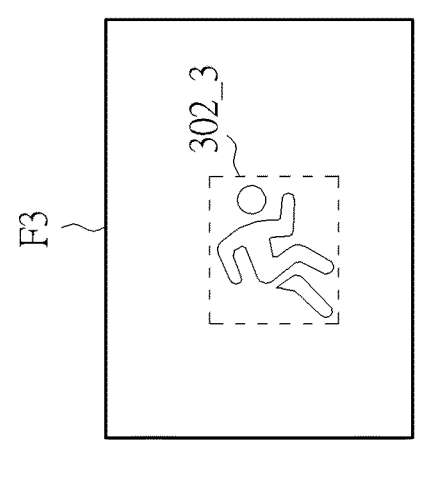
FIG. 3 is a diagram of multiple images inputted into the neural network module during a training phase.
Figure 3:
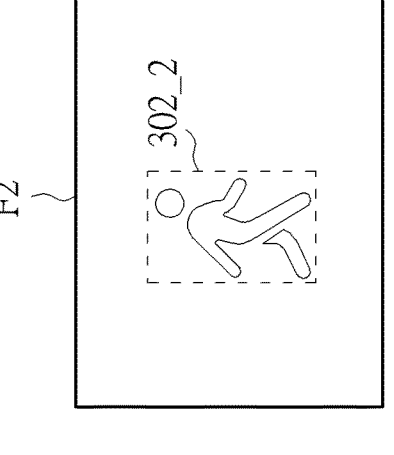
Figure 3:
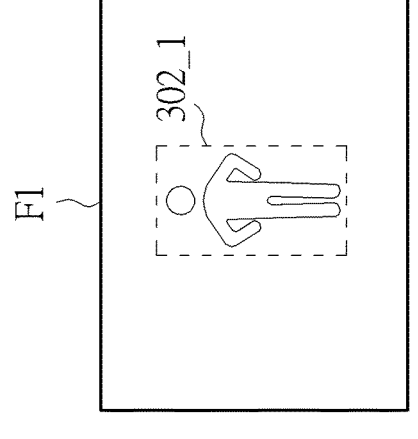

Specifically, as shown in FIG. 3, it is assumed that multiple images inputted into the neural network module 122 in the training phase include training images F1-F3, wherein each of the regions 302_1-302_3 in the training images F1-F3 comprise a person. For the training image F1, the training parameters (i.e. training target) may include the real position information of the center point, width and height (x1, y1, w1, h1) of the region 302_1 and a distance adjustment information 'r1', wherein the distance adjustment information 'r1' is generated according to the real distance 'd1' and the initial distance 'k1' between the image capture device 110 and the person (for example, according to the formula (2)), and the initial distance 'k1' is generated according to the real position information (for example, according to the formula (1)). After the neural network module 122 receives and processes the training image F1, the generated training output tensor will be performed a loss function (for example, sum-squared error) operation with the training parameters, for calibrating parameters within one or more convolutional layers in the neural network module 122, so that the training output tensor generated by the calibrated neural network module 122 is closer to the training parameters. For the training image F2, the training parameters (i.e. training target) may include the real position information of the center point, width and height (x2, y2, w2, h2) of the region 302_2 and a distance adjustment information 'r2', wherein the distance adjustment information 'r2' is generated according to the real distance 'd2' and the initial distance 'k2' between the image capture device 110 and the person (for example, according to the formula (2)), and the initial distance 'k2' is generated according to the real position information (for example, according to the formula (1)). After the neural network module 122 receives and processes the training image F2, the generated training output tensor will be performed a loss function operation with the training parameters, for calibrating the parameters within one or more convolutional layers in the neural network module 122, so that the training output tensor generated by the calibrated neural network module 122 is closer to the training parameters. For the training image F3, the training parameters (i.e. training target) may include the real position information of the center point, width and height (x3, y3, w3, h3) of the region 302_3 and a distance adjustment information 'r3', wherein the distance adjustment information 'r3' is generated according to the real distance 'd3' and the initial distance 'k3' between the image capture device 110 and the person (for example, according to the formula (2)), and the initial distance 'k3' is generated according to the real position information (for example, according to the formula (1)). After the neural network module 122 receives and processes the training image F3, the generated training output tensor will be performed a loss function operation with the training parameters, for calibrating the parameters within one or more convolutional layers in the neural network module 122, so that the training output tensor generated by the calibrated neural network module 122 is closer to the training parameters, . . . , and so on.

As mentioned above, by using images with different actions/postures of persons for training in the training phase of the neural network module 122, and using the distance adjustment information r1, r2, r3, . . . etc. as training targets, the distance adjustment information 'r' in the output tensor generated by the neural network module 122 in formal use can reflect the posture or action of the person, so as to accurately calculate the estimated distance between the image capture device 110 and the person.

Figure 4:
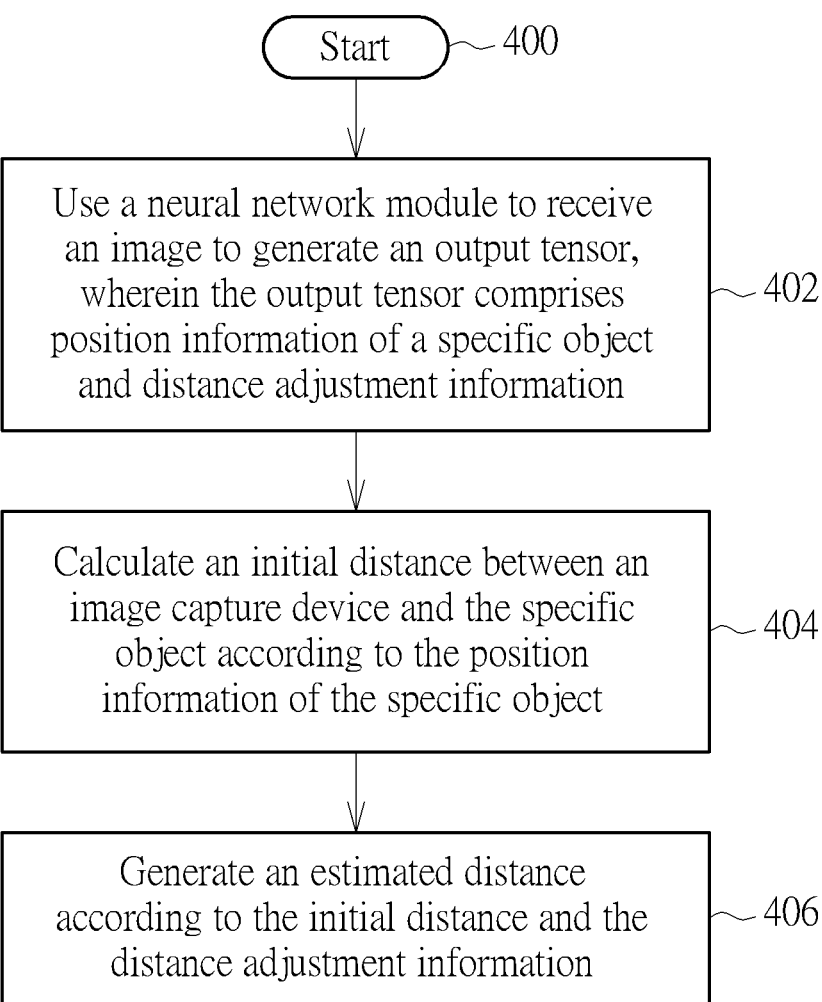
FIG. 4 is a flowchart of a detection method according to one embodiment of the present invention.

FIG. 4 is a flowchart of a detection method according to one embodiment of the present invention. Referring to the above embodiments, the flow of the detection method is described as follows.

Step 400: The flow starts.

Step 402: Use a neural network module to receive an image to generate an output tensor, wherein the output tensor comprises position information of a specific object and distance adjustment information.

Step 404: Calculate an initial distance between an image capture device and the specific object according to the position information of the specific object.

Step 406: Generate an estimated distance according to the initial distance and the distance adjustment information.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A detection circuit, comprising:
   a neural network module circuit, configured to receive an image to generate an output tensor, wherein the output tensor comprises position information of a specific object and distance adjustment information, wherein the distance adjustment information is a dimensionless scaling factor; and
   a calculation circuit, coupled to the neural network module, configured to calculate an initial distance between an image capture device and the specific object according to the position information of the specific object, and generate an estimated distance according to the initial distance and the distance adjustment information;
   wherein the specific object is a person, the output tensor comprises the position information of the person and the distance adjustment information; and the calculation circuit calculates the initial distance between the image capture device and the specific object according to the position information, a default width and a default height of the person;
   wherein the calculation circuit multiplies the distance adjustment information by the initial distance to generate the estimated distance.

2. The detection circuit of claim 1, wherein during a training phase of the neural network module, the neural network module circuit receives a plurality of training images; and for each of the plurality of training images, the neural network module circuit receives the training image to generate a training output tensor, and a loss function operation is performed on the training output tensor and a training parameter for calibrating parameters in the neural network module; wherein the plurality of training images respectively comprise persons with different actions/postures.

3. The detection circuit of claim 2, wherein the training parameter comprises another distance adjustment information calculated according to a real distance between the image capture device and the person and real position information of the person, wherein the another distance adjustment information serves as a training target in the training phase of the neural network module.

4. A detection method, comprising:
   using a neural network module circuit to receive an image to generate an output tensor, wherein the output tensor comprises position information of a specific object and distance adjustment information, wherein the distance adjustment information is a dimensionless scaling factor; and
   calculating an initial distance between an image capture device and the specific object according to the position information of the specific object; and
   generating an estimated distance according to the initial distance and the distance adjustment information;
   wherein the specific object is a person, the output tensor comprises the position information of the person and the distance adjustment information; and the step of calculating the initial distance between the image capture device and the specific object according to the position information of the specific object comprises:
   calculating the initial distance between the image capture device and the specific object according to the position information, a default width and a default height of the person;
   wherein the step of generating the estimated distance according to the initial distance and the distance adjustment information comprises:
   multiplying the distance adjustment information by the initial distance to generate the estimated distance.

5. The detection method of claim 4, further comprising:
   during a training phase of the neural network module,
   receiving a plurality of training images, wherein the plurality of training images respectively comprise persons with different actions/postures;
   for each of the plurality of training images, using the neural network module circuit to receive the training image to generate a training output tensor; and
   performing a loss function operation on the training output tensor and a training parameter, for calibrating parameters in the neural network module.

6. The detection method of claim 5, wherein the training parameter comprises another distance adjustment information calculated according to a real distance between the image capture device and the person and real position information of the person, wherein the another distance adjustment information serves as a training target in the training phase of the neural network module.

7. The detection circuit of claim 3, wherein the another distance adjustment information is a ratio of the real distance to an initial training distance calculated according to the real position information.

8. The detection method of claim 6, wherein the another distance adjustment information is a ratio of the real distance to an initial training distance calculated according to the real position information.

* * * * *